United States Patent [19]
Yoshimura et al.

[11] Patent Number: 5,747,898
[45] Date of Patent: *May 5, 1998

[54] METHOD FOR DRIVING STEPPING MOTOR OF MULTIPHASE HYBRID TYPE

[75] Inventors: Noriyuki Yoshimura; Kenji Yoshida, both of Nagano, Japan

[73] Assignee: Minebea Co., Ltd., Kitasaku-gun, Japan

[*] Notice: The term of this patent shall not extend beyond the expiration date of Pat. No. 5,

[21] Appl. No.: 798,787

[22] Filed: Feb. 12, 1997

Related U.S. Application Data

[63] Continuation of Ser. No. 313,131, filed as PCT/JP94/00138, Feb. 1, 1994 published as WO94/18742, Aug. 18, 1994, abandoned.

[30] Foreign Application Priority Data

Feb. 1, 1993 [JP] Japan ..................... 5-036056

[51] Int. Cl.$^6$ ............................................. H02K 37/04
[52] U.S. Cl. ............................ 310/49 R; 318/696
[58] Field of Search ......................... 310/49 R, 162, 310/163, 164, 165; 318/696, 685

[56] References Cited

U.S. PATENT DOCUMENTS

| | | | |
|---|---|---|---|
| 3,866,104 | 2/1975 | Heine | 318/696 |
| 4,000,452 | 12/1976 | Heine | 318/696 |
| 4,385,247 | 5/1983 | Satomi | 310/49 R |
| 5,374,865 | 12/1994 | Yoshimura et al. | 310/49 R |

FOREIGN PATENT DOCUMENTS

| | | |
|---|---|---|
| A 23 42 994 | 3/1975 | Germany. |
| 60-111382 | 7/1985 | Japan. |
| 61-185056 | 8/1986 | Japan. |
| 1-32748 | 7/1989 | Japan. |

*Primary Examiner*—Steven L. Stephan
*Assistant Examiner*—Judson H. Jones
*Attorney, Agent, or Firm*—Staas & Halsey

[57] ABSTRACT

In a hybrid type stepping motor, variation in the torque is reduced to as low as possible, the torque stiffness is improved, and the resonant vibration during the rotating movement is minimized. Each fixed magnetic pole has two or more of small teeth arranged at intervals of the same pitch as of the teeth of a rotor. The total number of the small teeth of a stator segment of an asymmetrical form is determined by $NS=5\times(n0+n1)$, where n0 is the number of the small teeth on each of five of the ten fixed magnetic poles and n1 is the number of the small teeth on each of the remaining five fixed magnetic poles. The fixed magnetic poles with the n1 small teeth are arranged alternately with the fixed magnetic poles with the n0 small teeth. The n1 small teeth poles and the n0 small teeth poles are disposed opposite to each other about the axis of a rotary shaft. The relation between the total number of the teeth of the rotor and the total number of the small teeth of the stator segment is expressed by $NS \geq 0.8NR$ (NS being greater than or equal to 0.8NR). A difference between NR and NS is calculated from $NR-NS=K(S0-S1)+10(S1-1+B)$ where K is an integer from 2 to 5, S0 and S1 are smallest possible integers or may be equal, and B is a fraction of 1 so that 10B is always an integer. Ten windings on their respective fixed magnetic poles are energized by a power supplying means to produce desired numbers of N and S poles. The full step angle is equal to an electric angle $90°=aH=360°/10NR$ and thus, the half step angle is an electric angle $45°=aH=360°/20NR$. In action, the magnetization of the fixed magnetic poles at each step produces N and S poles of the same number. Also, one or more pairs of adjacent magnetic poles are polarized to S at each step.

2 Claims, 7 Drawing Sheets

FIG. 6

| STEP \ POLE | 1 | 2 | 3 | 4 | 5 | 6 | 7 | 8 | 9 | 10 |
|---|---|---|---|---|---|---|---|---|---|---|
| 1  | N | S | S | N | - | S | N | N | S | - |
| 2  | N | S | - | N | S | S | N | - | S | N |
| 3  | - | S | N | N | S | - | N | S | S | N |
| 4  | S | S | N | - | S | N | N | S | - | N |
| 5  | S | - | N | S | S | N | - | S | N | N |
| 6  | S | N | N | S | - | N | S | S | N | - |
| 7  | S | N | - | S | N | N | S | - | N | S |
| 8  | - | N | S | S | N | - | S | N | N | S |
| 9  | N | N | S | - | N | S | S | N | - | S |
| 10 | N | - | S | N | N | S | - | N | S | S |

FIG. 7

| STEP \ POLE | 1 | 2 | 3 | 4 | 5 | 6 | 7 | 8 | 9 | 10 |
|---|---|---|---|---|---|---|---|---|---|---|
| 1  | N | S | S | N | N | S | N | N | S | S |
| 2  | N | S | S | N | - | S | N | N | S | - |
| 3  | N | S | S | N | S | S | N | N | S | N |
| 4  | N | S | - | N | S | S | N | - | S | N |
| 5  | N | S | N | N | S | S | N | S | S | N |
| 6  | - | S | N | N | S | - | N | S | S | N |
| 7  | S | S | N | N | S | N | N | S | S | N |
| 8  | S | S | N | - | S | N | N | S | - | N |
| 9  | S | S | N | S | S | N | N | S | N | N |
| 10 | S | - | N | S | S | N | - | S | N | N |
| 11 | S | N | N | S | S | N | S | S | N | N |
| 12 | S | N | N | S | - | N | S | S | N | - |
| 13 | S | N | N | S | N | N | S | S | N | S |
| 14 | S | N | - | S | N | N | S | - | N | S |
| 15 | S | N | S | S | N | N | S | N | N | S |
| 16 | - | N | S | S | N | - | S | N | N | S |
| 17 | N | N | S | S | N | S | S | N | N | S |
| 18 | N | N | S | - | N | S | S | N | - | S |
| 19 | N | N | S | N | N | S | S | N | S | S |
| 20 | N | - | S | N | N | S | - | N | S | S |

METHOD FOR DRIVING STEPPING MOTOR OF MULTIPHASE HYBRID TYPE

This application is a continuation of application Ser. No. 08/313,131, filed as PCT/JP94/00138, Feb. 1, 1994 published as WO94/18742, Aug. 18, 1994, now abandoned.

PRIOR ART

The present invention relates to an improved method of driving a 5-phase hybrid stepping motor.

BACKGROUND OF THE INVENTION

Hybrid stepping motors have been well known for over a quarter of a century as actuators appropriated for highly accurate positioning movements. The hybrid stepping motors are widely used in various machine tools, e.g. with fully automated production lines, as well as computer related instruments including printers, plotters, facsimile machines, and disk drive units.

For increasing the versatility in use, there is made an attempt to minimize the step angle of such a hybrid stepping motor. To this respect, four- and five-phase types of stepping motors are now commonly provided.

The conventional four- or five-phase stepping motors however, have some the following disadvantages: torque stiffness is unstable, static torque is varied depending on the stop position, and the step angle is not at a high accuracy. It is an object of the present invention to eliminate the foregoing disadvantages.

SUMMARY OF THE INVENTION

For achievement of the above object, a method of driving a multi-phase hybrid type stepping motor which has a rotor provided with one or more permanent magnets magnetized in the rotating direction of a rotary shaft, according to the present invention, is characterized by a two pole caps mounted to both ends of the permanent magnet respectively, each the pole cap made of a soft magnetic material and having a plurality (NR) of teeth arranged at equal intervals on the circumferential surface thereof, the teeth of the two pole caps being displaced by ½ of the teeth pitch (½ Tp) from each other, a plurality of stator segments of an asymmetrical form disposed around the rotor, each the asymmetrical stator segment having ten fixed magnetic poles thereof extending inwardly and radially, each of the fixed magnetic poles having a winding wound thereon with no taps and being provided with two or more small teeth arranged at equal intervals of the same pitch as of the teeth of the rotor, the total number (NS) of the small teeth of the asymmetrical stator segment being determined by NS=5x(n0+n1), where n0 is the number of the small teeth on each of five of the ten fixed magnetic poles and n1 is the number of the small teeth on each of the remaining five fixed magnetic poles, the fixed magnetic poles with the n1 small teeth being arranged alternately with the fixed magnetic poles with the n0 small teeth, the n1 small teeth pole and the n0 small teeth pole being disposed opposite to each other about the axis of the rotary shaft, the relation between the total number (NR) of the teeth of the rotor and the total number (NS) of the small teeth of the stator segment being expressed by NS≧0.8NR. (NS being greater than or equal to 0.8NR), a difference between NR and NS being calculated from NR−NS=K(S0−S1)+10(S1−1+B) where K is an integer from 2 to 5, S0 and S1 are smallest possible integers or may be equal, and B is a fraction of 1 so that 10B (ten times of B) is always an integer, the ten stator windings on their respective fixed magnetic poles being coupled to one another in a circular order of P1, P6, P5, P10, P9, P4, P3, P8, P7, and P2, five terminals disposed between P1 and P2, P5 and P6, P9 and P10, P3 and P4, and P7 and P8 respectively, and by polarization of the ten fixed magnetic poles at each step of the rotating movement, N and S poles of the same number being generated and one or more pairs of the adjacent fixed magnetic poles being turned to S.

BRIEF DESCRIPTION OF THE DRAWINGS

FIG. 6 is a chart showing the magnetic shift at fixed magnetic poles in full-step mode; and FIG. 7 is a chart showing the magnetic shift at the fixed magnetic poles in half-step mode.

THE PREFERRED EMBODIMENTS OF THE PRESENT INVENTION

Preferred embodiments of the present invention will be described in more details referring to the accompanying drawings.

Figure 1:
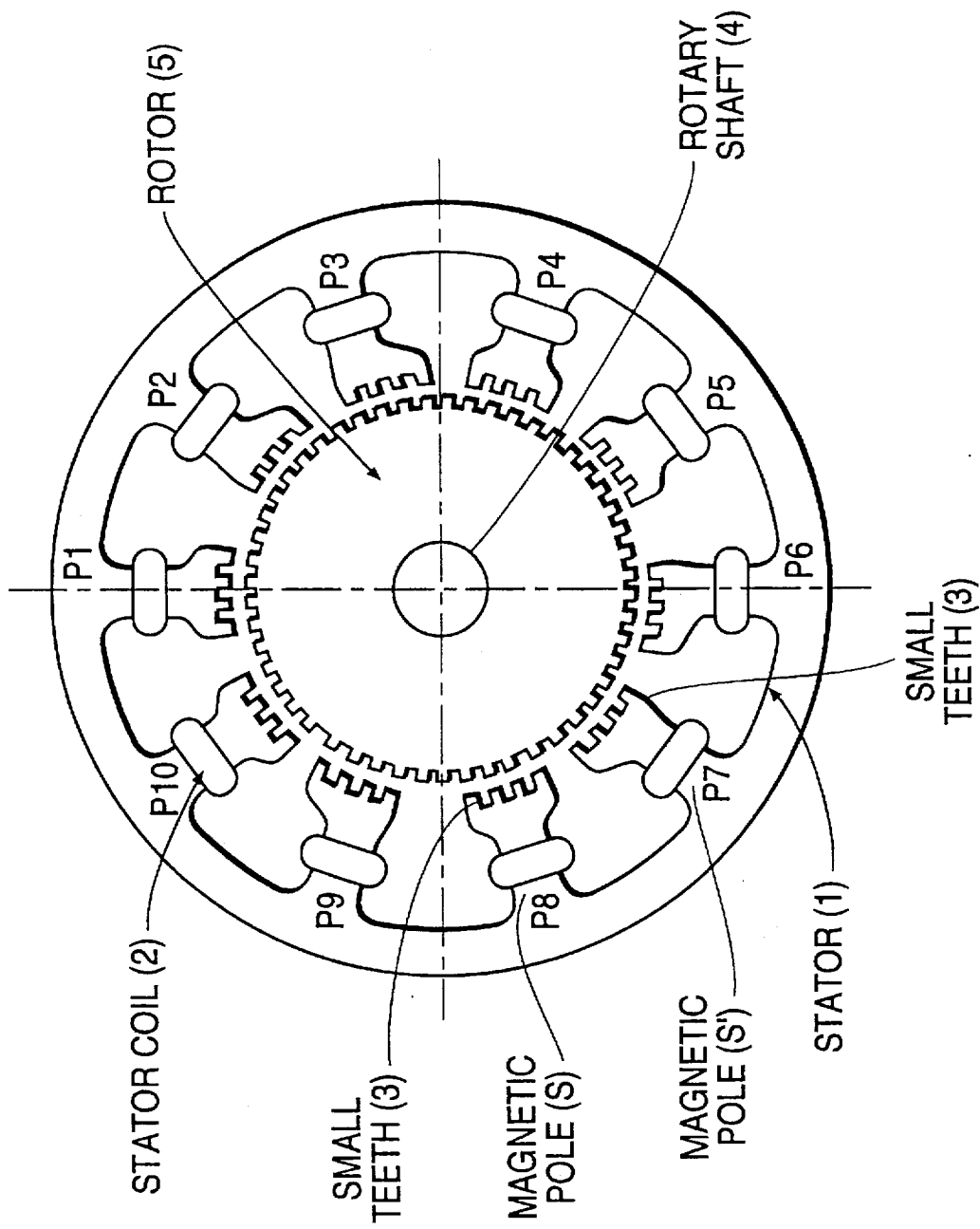
FIG. 1 is a cross sectional view showing one embodiment of the present invention.
Figure 2:
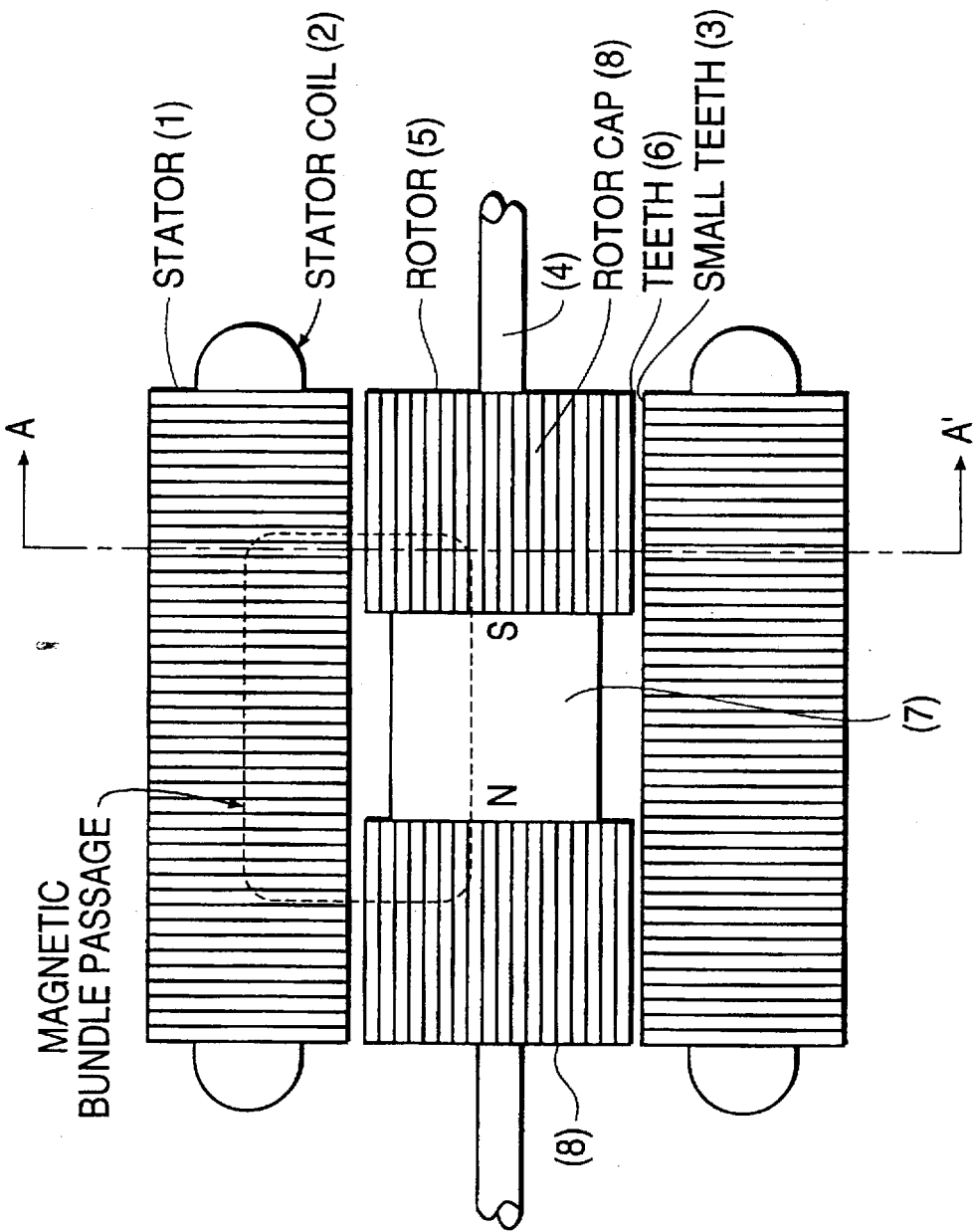
FIG. 2 is a longitudinal sectional view of the embodiment of the present invention.

FIGS. 1 and 2 illustrate in cross section a stepping motor according to the present invention. FIG. 1 is a cross sectional view taken along the line extending at a right angle to a rotary shaft 4. As shown, a stator 1 has ten fixed magnetic poles S, S' arranged inwardly thereof. The fixed magnetic pole S or S' has a stator coil 2 wound thereon and is provided at inward end with a set of small teeth 3. It is assumed that the total number of the small teeth 3 is NS. The rotary shaft 4 has a rotor 5 mounted at the center thereof. The rotor 5 has a permanent magnet 7 mounted to the axial center thereof and two rotor caps 8 fitted to both sides of the magnet 7 respectively, as best shown in FIG. 2. The rotor caps 8 have a plurality of teeth 6 provided on the circumferential surface thereof. It is now assumed that the total number of the teeth 6 is NR. FIG. 1 is a cross sectional view taken along the line A—A of FIG. 2. The ten stator coils 2 are numbered from P1 to P10.

Figure 3:
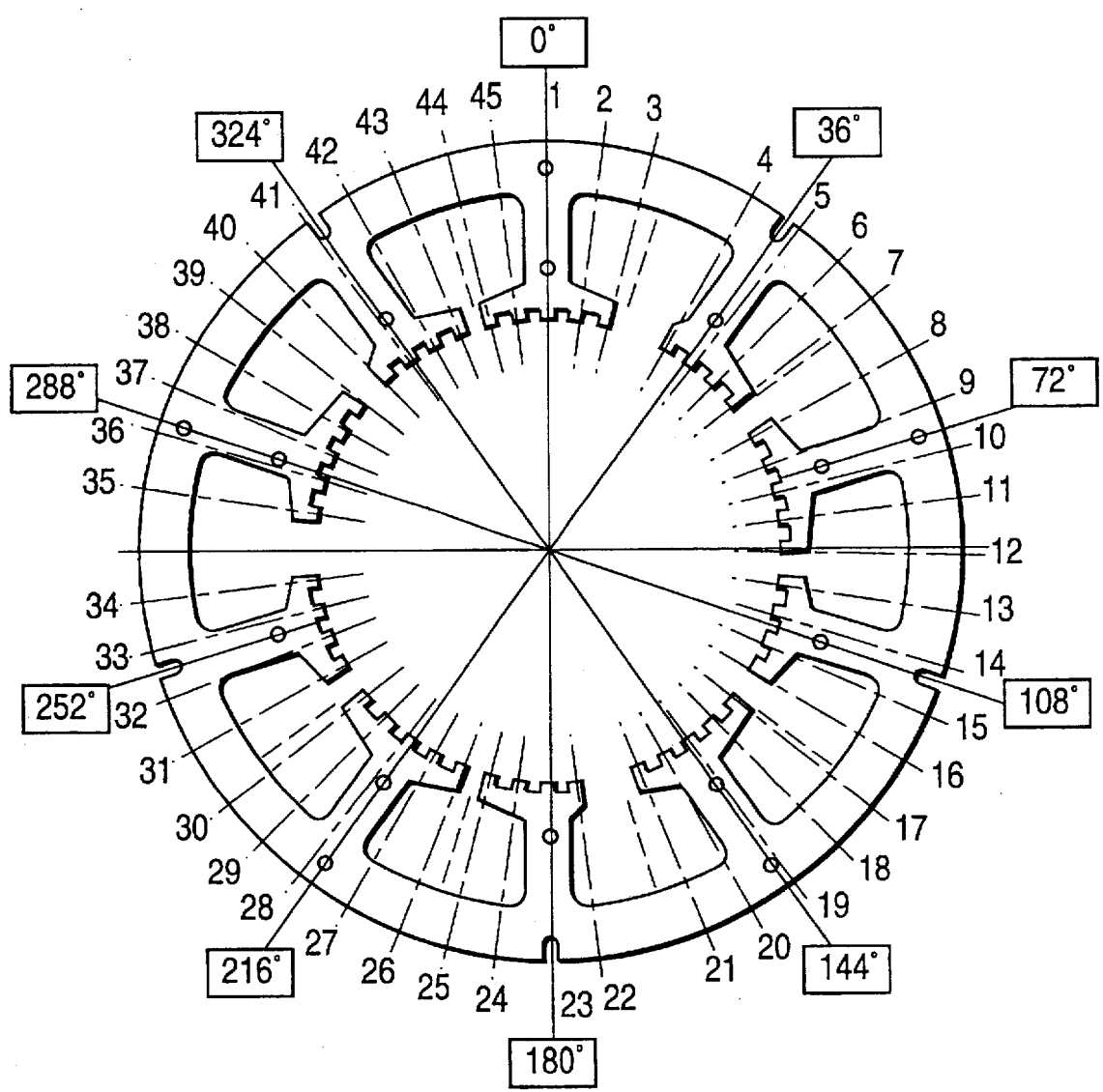
FIG. 3 is a front view of a stator system according to another embodiment of the present invention.

A first embodiment of the present invention is intended to have a five-phase stepping motor with the ten fixed magnetic poles S, S' improved in the torque stiffness, the step angle precision, and the efficiency of movement when NR=50 (where a shift angle between two adjacent fixed magnetic poles is ⅕ Tp, Tp being a pitch of the small teeth 3). In particular, the number of the small teeth 3 of each alternate one of the ten fixed magnetic poles is increased by one while that of the other fixed magnetic poles is kept at four (forming an asymmetrical fixed magnetic pole arrangement of the stator). Accordingly, the 4-tooth fixed magnetic pole S is disposed opposite to the 5-tooth fixed magnetic pole S' (FIG. 3).

The difference of the teeth between the rotor 5 and the fixed magnetic poles S,S' is 5 (as calculated by subtracting 4×5 from 50 and then, 5×5 from the result).

This embodiment also offers an improvement in the stability at torque equilibrium position. The reason is that while at least two adjacent fixed magnetic poles are polarized to N, other two adjacent fixed magnetic poles are turned to S (FIG. 6).

As compared with the first embodiment in which the improvement in the four different respects is ensured with the rotor having 40, 50, 80, 90, or 100 teeth, using such an asymmetrical arrangement of the ten fixed magnetic poles of the stator, a second embodiment is characterized by the shift angle between two adjacent fixed magnetic poles which is equal to 3/10 Tp or 7/10 Tp. Equally, the number of the small teeth 3 of every alternate one of the fixed magnetic poles is increased by one.

For determining an optimum degree of the step angle for performance of a stepping motor, the difference of teeth between the rotor and the stator is preferably 5 or 3.

Figure 4:
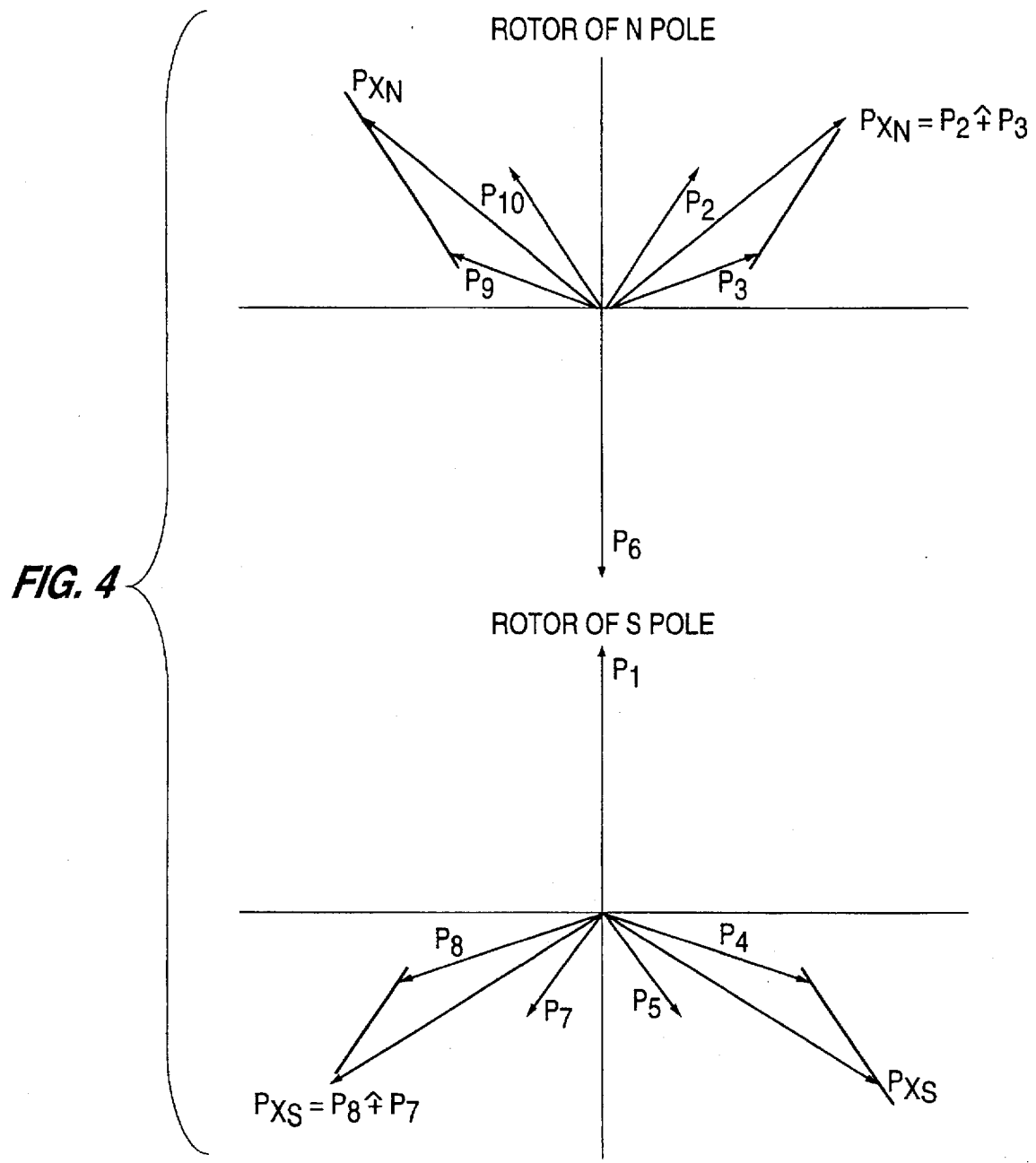
FIG. 4 is a vector diagram of a rotor in the embodiment of the present invention.

As shown in FIG. 4, a radial stress exerted on the rotor caps is divided in three directions. The stress is evenly applied to the two rotor caps. The three directional components of the stress may affect the manufacturing tolerance less. Thereby, the step angle accuracy will increase and unwanted vibration will be reduced. This is because there are provided only three large distanced slots between the fixed magnetic poles. FIG. 6 shows the polarization of the fixed magnetic poles during a series of 20 consecutive steps. The full 20 steps perform one rotation of the rotary shaft 4. As apparent from FIG. 6, the number of N poles is identical to the number of S poles in the stepping motor at every position or step. This results in reduction of the hysteresis.

Figure 5:
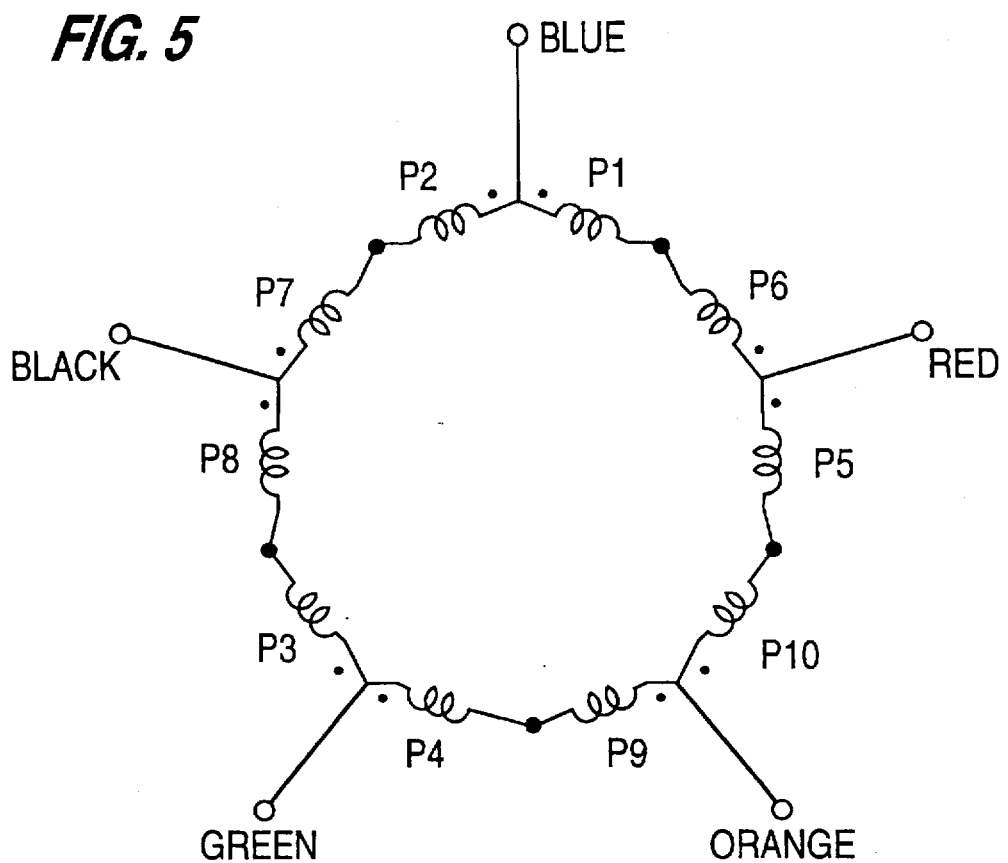
FIG. 5 is a wiring diagram according to the embodiment of the present invention.

The step-by-step rotating movement will now be described referring to FIGS. 5 and 6. FIG. 5 is a wiring diagram according to the embodiment of the present invention. The ten fixed magnetic poles are coupled to one another in a circular order of P1, P6, P5, P10, P9, P4, P3, P8, P7, and P2. Five, blue, red, orange, green, and black colored, terminals are provided between P1 and P2, P5 and P6, P9 and P10, P3 and P4, and P7 and P8 respectively. FIG. 6 is a diagram showing the polarization of the fixed magnetic poles in a full step mode. The dots in FIG. 5 represent the direction of coil windings.

Each of the blue, red, orange, green, and black colored terminals is coupled to a two-throw switch which normally stays in the neutral mode and is turned to one position for connecting to a positive source and to the other position for connecting to a negative source, although its switching circuit is not shown in FIG. 5. The switch is selectively connected to one of the three positions by a command signal from an unshown control unit. Accordingly, the ten magnetic poles are energized to have polarities as shown in FIG. 6 at each step. The switching action at the step produces the two polar states of the same number where at least two adjacent magnetic poles are polarized to S.

FIG. 7 is a diagram showing the polarization of the fixed magnetic poles at the steps in a half step mode.

As set forth above, the present invention with the foregoing arrangement allows the torque stiffness to be stable, the static torque to be equilibrated, and the step angle to be at high accuracy. In both the full and half step modes, the S and N poles of the same number are produced and also, at least two adjacent fixed magnetic poles are polarized to S at each step of the movement. This will minimize abnormal vibration during the rotating movement.

APPLICABILITY TO INDUSTRIAL USE

As the specific teeth arrangements of the rotor and the stator are provided in a combination, the static torque acts in equilibrium and the step angle stays at high accuracy. In addition, the S and N poles become equal in the number in the full step mode, abnormal vibration during the rotating movement will be minimized.

What is claimed is:

1. A multi-phase hybrid type stepping motor comprising;

a rotor provided with at least one permanent magnet magnetized in a rotating direction of a rotary shaft, two pole caps mounted to both ends of the permanent magnet respectively, each of the pole caps being made of a soft magnetic material and having a plurality (NR) of teeth arranged at equal intervals on the circumferential surface thereof, the teeth of the two pole caps being displaced by ½ of a teeth pitch (½ Tp) from each other;

a plurality of stator segments of an asymmetrical form disposed around the rotor, each of the asymmetrical stator segments having ten fixed magnetic poles thereof extending inwardly and radially, each of the fixed magnetic poles having a winding wound thereon with no taps and being provided with two or more small teeth arranged at equal intervals of the same pitch as of the teeth of the rotor, the total number (NS) of the small teeth of the asymmetrical stator segment being determined by NS=5×(n0+n1), where n0 is the number of the small teeth on each of five of the ten fixed magnetic poles and n1 is the number of the small teeth on each of the remaining five fixed magnetic poles and n1 does not equal n0, the fixed magnetic poles with the n1 small teeth being arranged alternately with the fixed magnetic poles with the n0 small teeth, the n1 small teeth pole and the n0 small teeth pole being disposed opposite to each other about the axis of the rotary shaft, the relation between the total number (NR) of the teeth of the rotor and the total number (NR) of the small teeth of the stator segment being expressed by NS≧0.8NR (NS being greater than or equal to 0.8NR), a difference between NR and NS being calculated from NR−NS=K(S0−S1)+10(S1−1+B) where K is an integer from 2 to 5, S0 and S1 are smallest possible integers or may be equal, and B is a fraction of 1 so that 10B (ten times B) is always an integer, the ten stator windings on their respective fixed magnetic poles being coupled to one another in a circular order of P1, P6, P5, P10, P9, P4, P3, P8, P7 and P2, five terminals disposed between P1 and P2, P5 and P6, P9 and P10, P3 and P4, and P7 and P8 respectively, and by polarization of the ten fixed magnetic poles at each step of the rotating movement, N and S poles of the same number being generated and one or more pairs of the adjacent fixed magnetic poles being turned to S.

2. A multi-phase hybrid type stepping motor comprising:

a rotary shaft;

a rotor mounted to said rotary shaft;

a stator mounted to surround the rotor;

pole caps mounted to said rotor, wherein each of said pole caps has a number NR of small teeth thereon;

wherein the stator includes a number NS of teeth formed thereon;

wherein NS≧0.8NR; and wherein NS−NR=K(S0−S1)+10(S1−1+B) where K is an integer between 2 and 5, S0 and S1 are the smallest possible integers or may be equal, and B is a fraction of 1 so that 10B is an integer wherein the stator includes fixed magnetic poles each having small teeth thereon, with the number of small teeth alternating between n0 and n1 on adjacent fixed magnetic poles with n0 not equaling n1.

* * * * *